(12) United States Patent
Ichihashi

(10) Patent No.: US 8,144,259 B2
(45) Date of Patent: Mar. 27, 2012

(54) BROADCAST RECEIVING APPARATUS AND METHOD FOR MINIMIZING PROGRAM INTERRUPTION BY AN EMERGENCY WARNING SIGNAL

(75) Inventor: Nobuharu Ichihashi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 1415 days.

(21) Appl. No.: 11/627,647

(22) Filed: Jan. 26, 2007

(65) Prior Publication Data

US 2007/0204291 A1 Aug. 30, 2007

(30) Foreign Application Priority Data

Feb. 21, 2006 (JP) .................................. 2006-043966

(51) Int. Cl.
*H04N 5/44* (2011.01)
(52) U.S. Cl. ...................................................... 348/725
(58) Field of Classification Search .................. 348/465, 348/706, 731, 563–565, 732, 552, 553, 558, 348/569, 725; 725/33, 131, 139, 56, 59
See application file for complete search history.

(56) References Cited

U.S. PATENT DOCUMENTS

| | | | | |
|---|---|---|---|---|
| 5,867,227 | A * | 2/1999 | Yamaguchi | 725/56 |
| 6,133,912 | A * | 10/2000 | Montero | 715/716 |
| 6,961,511 | B2 * | 11/2005 | Ohno et al. | 386/239 |
| 7,027,108 | B2 * | 4/2006 | Kim | 348/732 |
| 7,369,823 | B2 * | 5/2008 | Oiwa | 455/135 |
| 7,400,364 | B2 * | 7/2008 | Chen et al. | 348/731 |
| 7,505,087 | B2 * | 3/2009 | Kang | 348/731 |
| 2003/0204853 | A1 * | 10/2003 | Fries et al. | 725/93 |
| 2003/0216133 | A1 * | 11/2003 | Poltorak | 455/404.1 |
| 2004/0181814 | A1 * | 9/2004 | Ellis et al. | 725/134 |
| 2004/0244035 | A1 * | 12/2004 | Wright et al. | 725/32 |
| 2005/0118984 | A1 | 6/2005 | Akiyama et al. | |
| 2006/0130100 | A1 * | 6/2006 | Pentland | 725/68 |
| 2007/0115391 | A1 * | 5/2007 | Anderson | 348/565 |

FOREIGN PATENT DOCUMENTS

| | | |
|---|---|---|
| JP | 2004-023591 A | 1/2004 |
| JP | 2005-159779 A | 6/2005 |

* cited by examiner

*Primary Examiner* — Paulos Natnael
(74) *Attorney, Agent, or Firm* — Carter, DeLuca, Farrell & Schmidt, LLP

(57) ABSTRACT

A broadcast receiving apparatus is equipped with a plurality of tuners that can respectively receive a control signal including region information identifying a region and channel designation information designating a program broadcast channel. A channel selection action of each tuner, display processing for a display unit, and recording processing for a storage unit are controlled based on a channel selection state of each tuner and the control signal. Furthermore, a tuner to select a channel designated by the channel designation information is determined based on a state of use of each tuner.

22 Claims, 10 Drawing Sheets

BROADCAST RECEIVING APPARATUS AND METHOD FOR MINIMIZING PROGRAM INTERRUPTION BY AN EMERGENCY WARNING SIGNAL

BACKGROUND OF THE INVENTION

1. Field of the Invention

The present invention relates to a broadcast receiving apparatus configured to receive broadcast waves of digital and analog television broadcasting services or terrestrial and satellite broadcasting services, and also relates to a method for controlling a broadcast receiving apparatus. In particular, when a broadcast receiving apparatus includes plural tuners simultaneously receiving plural programs, the present invention can transmit the contents of an emergency warning broadcast to a viewer/listener and minimize an interruption by such a specific broadcast when a user is viewing or recording a television program.

2. Description of the Related Art

Television viewers can enjoy different types of broadcasting services, including analog terrestrial broadcasting, analog broadcasting satellite (BS) broadcasting, cable broadcasting, digital terrestrial broadcasting, digital BS broadcasting, and digital communication satellite (CS) broadcasting.

Recent television receivers, set-top boxes (STBs), and digital video recorders (DVRs) are configured to receive two or more types of broadcasting services. Thus, television viewers can use plural tuners for receiving different broadcast programs. For example, a user can record a CS broadcast program while viewing a digital terrestrial broadcast program. If a television receiver is equipped with two digital terrestrial broadcast tuners, a user can simultaneously record two different programs in the same time slot.

Since 1985, an emergency warning system (EWS) has been managed in Japan for the purpose of immediately informing the public of an occurrence of serious disaster or earthquake through television broadcasting or radio broadcasting. According to the emergency warning system, a broadcast station transmits an emergency warning broadcast signal and each receiver (e.g., television or radio) receives the emergency warning broadcast signal and performs a predetermined operation to let a viewer or listener recognize the occurrence of an emergency warning.

Japan Broadcasting Corporation (NHK) and other commercial broadcasting companies employ such an emergency warning system. In particular, NHK can transmit an emergency warning broadcast signal using all available broadcasting media, including digital terrestrial broadcasting, analog terrestrial broadcasting, and digital BS broadcasting. Therefore, each viewer/listener can receive an emergency warning broadcast signal through any broadcast receiver in an on state.

However, if a broadcast receiver is in an off state or in a stand-by mode, the receiver can receive no emergency warning broadcast program. Therefore, important information contained in an emergency warning may not be transmitted to some users.

To solve the above-mentioned drawback, as discussed in Japanese Patent Application Laid-Open No. 2004-023591, a display device can be forcibly activated if in an off state to receive a control signal from a television broadcast receiving apparatus (tuner) and transmit the contents of an emergency broadcast to a viewer/listener.

According to the technique discussed in Japanese Patent Application Laid-Open No. 2004-023591, a television broadcast receiving apparatus is equipped with a power source section capable of supplying electric power to a display device in an off state when an emergency warning is raised.

Furthermore, the technique discussed in Japanese Patent Application Laid-Open No. 2004-023591 includes processing for determining whether an installation location of the broadcast receiver is in a target area of the emergency broadcast with reference to installation location information of the broadcast receiver and region identification information involved in emergency information. If it is determined that the broadcast receiver is in the target area, electric power is supplied to the display device. If it is determined that the broadcast receiver is out of the target area, the emergency broadcast is not displayed on the display device.

If a broadcast receiver is equipped with a single tuner, the technique discussed in Japanese Patent Application Laid-Open No. 2004-023591 can be directly applied to the broadcast receiver. However, as described above, recent television receivers, STBs, and DVRs are equipped with plural tuners.

A user will be confused if the technique discussed in Japanese Patent Application Laid-Open No. 2004-023591 is applied to a broadcast receiving apparatus equipped with plural tuners. More specifically, an emergency warning broadcast can be received by each tuner. Each tuner independently operates to inform an occurrence of an emergency warning broadcast. Thus, in a situation that different television programs are displayed in a multi-screen display pattern on a display device, if a user simultaneously receives the same contents of an emergency warning broadcast through different (e.g., digital and analog, or terrestrial and BS) broadcast channels, the user may be unable to appropriately confirm and act in response to the emergency information.

In this respect, as discussed in Japanese Patent Application Laid-Open No. 2005-159779, a broadcast receiving apparatus can include plural reception systems each including a channel selection circuit (tuner) and a decoding circuit. One reception system can be used to continuously receive a reception signal for recording, while the other reception system can be used to select an emergency broadcast channel and display the contents of the emergency broadcast on a display device.

However, the technique discussed in Japanese Patent Application Laid-Open No. 2005-159779 cannot be directly employed if plural channels can simultaneously receive the same emergency warning broadcast. If plural channels simultaneously receive the same emergency warning broadcast, user's viewing or recording a broadcast program may be undesirably interrupted.

In this case, a user cannot properly view or record a desired program. The techniques disclosed in Japanese Patent Application Laid-Open No. 2004-023591 and Japanese Patent Application Laid-Open No. 2005-159779 cannot overcome these drawbacks.

SUMMARY OF THE INVENTION

Exemplary embodiments of the present invention are directed to a broadcast receiving apparatus and a control method that can transmit the contents of an emergency warning broadcast to a user even when the broadcast receiving apparatus includes plural tuners capable of receiving an emergency warning broadcast signal.

Furthermore, exemplary embodiments of the present invention are directed to a broadcast receiving apparatus and a control method that can minimize an interruption by a specific broadcast when a user is viewing or recording a broadcast program.

According to an aspect of the present invention, a broadcast receiving apparatus includes a plurality of tuners, including first and second tuners, capable of simultaneously receiving broadcast waves of plural channels to display a program of a received channel on a display unit or to record a program of a received channel on a storage unit, a storage unit configured to store installation location information of the broadcast receiving apparatus, an acquisition unit configured to obtain a control signal, the control signal including region information identifying a region and channel designation information designating a program broadcast channel, a determination unit configured to determine a channel selection state of each of the plurality of tuners; and a control unit configured to control a channel selection action of each of the plurality of tuners and display processing for the display unit or recording processing for the storage unit based on the control signal obtained by the acquisition unit and a determination result obtained by the determination unit. When the region information corresponds to the installation location information, if a channel designated by the channel designation information is different from a channel received by the first tuner and displayed on the display unit and is equal to a channel received by the second tuner, a program of the channel received by the first tuner is recorded on the storage unit.

According to another aspect of the present invention, a method is provided for controlling a broadcast receiving apparatus holding installation location information thereof and including a plurality of tuners, including first and second tuners, capable of simultaneously receiving broadcast waves of plural channels to display a program of a received channel on a display unit or to record a program of a received channel on a storage unit. The method includes obtaining a control signal, the broadcast receiver control signal including region information identifying a region and channel designation information designating a program broadcast channel, determining a channel selection state of each of the plurality of tuners; controlling a channel selection action of each of the plurality of tuners and display processing for the display unit or recording processing for the storage unit based on the control signal and a determination result of the channel selection state, and, when the region information corresponds to the installation location information, if a channel designated by the channel designation information is different from a channel received by the first tuner and displayed on the display unit and is equal to a channel received by the second tuner, recording a program of the channel received by the first tuner on the storage unit.

With the above-mentioned configuration, the contents of an emergency warning broadcast can be transmitted to a user even when the broadcast receiving apparatus includes plural tuners capable of receiving an emergency warning broadcast signal. Furthermore, an interruption by such a specific broadcast can be minimized when a user is viewing or recording a broadcast program.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
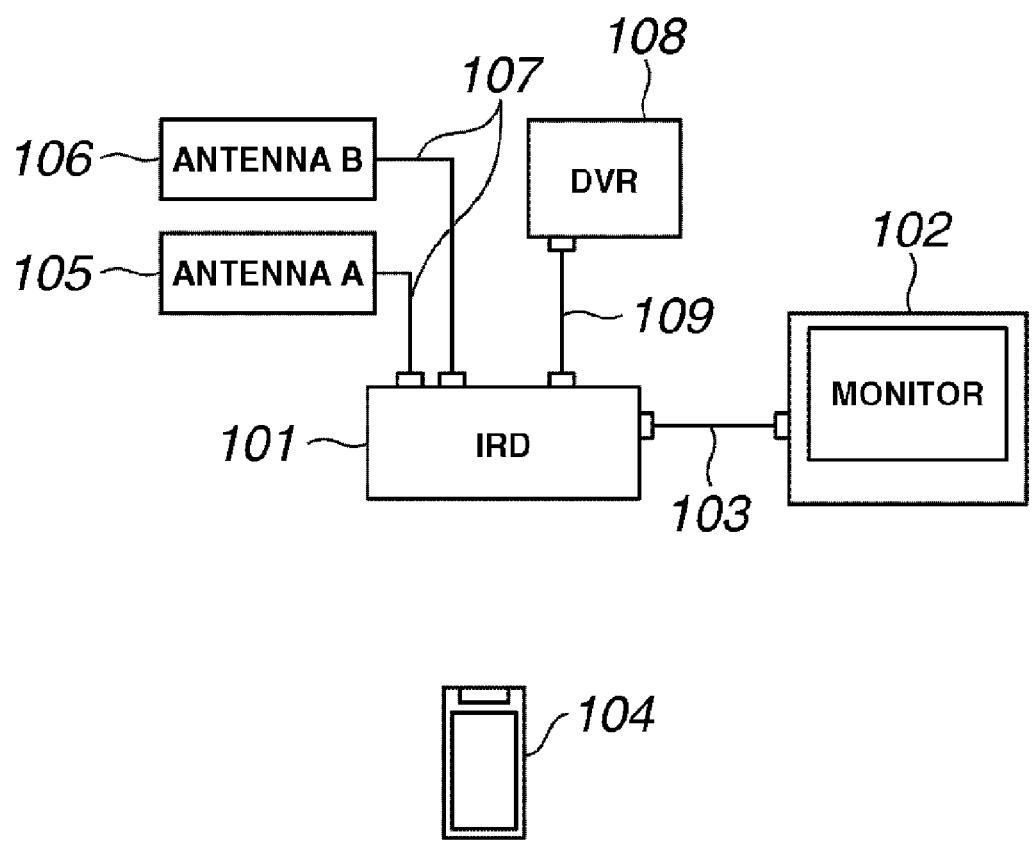
FIG. 1 is an illustration of a digital broadcast receiving system according to an exemplary embodiment of the present invention.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 is an illustration of a digital broadcast receiving system according to a first exemplary embodiment of the present invention. Each exemplary embodiment of the present invention is described based on a digital broadcast receiving system, although the present invention is not limited to the digital broadcast receiving system. In each exemplary embodiment of the present invention, an emergency warning broadcast is an example of a specific broadcasting different from the ordinary broadcasting.

However, the specific broadcasting in the present invention is not limited to an emergency warning broadcast and can include any other broadcasting if comparable to the emergency warning broadcast.

An integrated receiver/decoder (IRD) 101 can receive and decode digital broadcast data and output video data and audio data. A monitor 102 can display the video data and the audio data produced by the IRD 101. An audio and visual (AV)

cable 103 can transmit video data and audio data between the IRD 101 and the monitor 102. A remote controller 104 can transmit an instruction command to the IRD 101 or the monitor 102. An antenna A 105 can receive a digital terrestrial broadcast signal. An antenna B 106 can receive a digital satellite broadcast signal. An antenna cable 107 connects each antenna to the IRD 101.

A digital video recorder (DVR) 108 can record and store video data and audio data produced by the IRD 101 on a digital versatile disk (DVD), an optical disk, a hard disk, a magnetic disk, or other recording media. The monitor 102 can reproduce the video and audio data recorded and stored in the DVR 108. A digital cable 109 connects the IRD 101 to the DVR 108. The digital cable 109 is, for example, an IEEE1394 type or a local area network (LAN) type.

In FIG. 1, the IRD 101, the monitor 102, and the DVR 108 are housed in individual bodies. The system arrangement is not limited to a specific arrangement. For example, the IRD 101 and the DVR 108 can be assembled in the same housing. Although the antenna A 105 and the antenna B 106 receive different digital broadcast signals, the antenna A 105 and the antenna B 106 can be replaced with a cable that can transmit television broadcast data.

Figure 2:
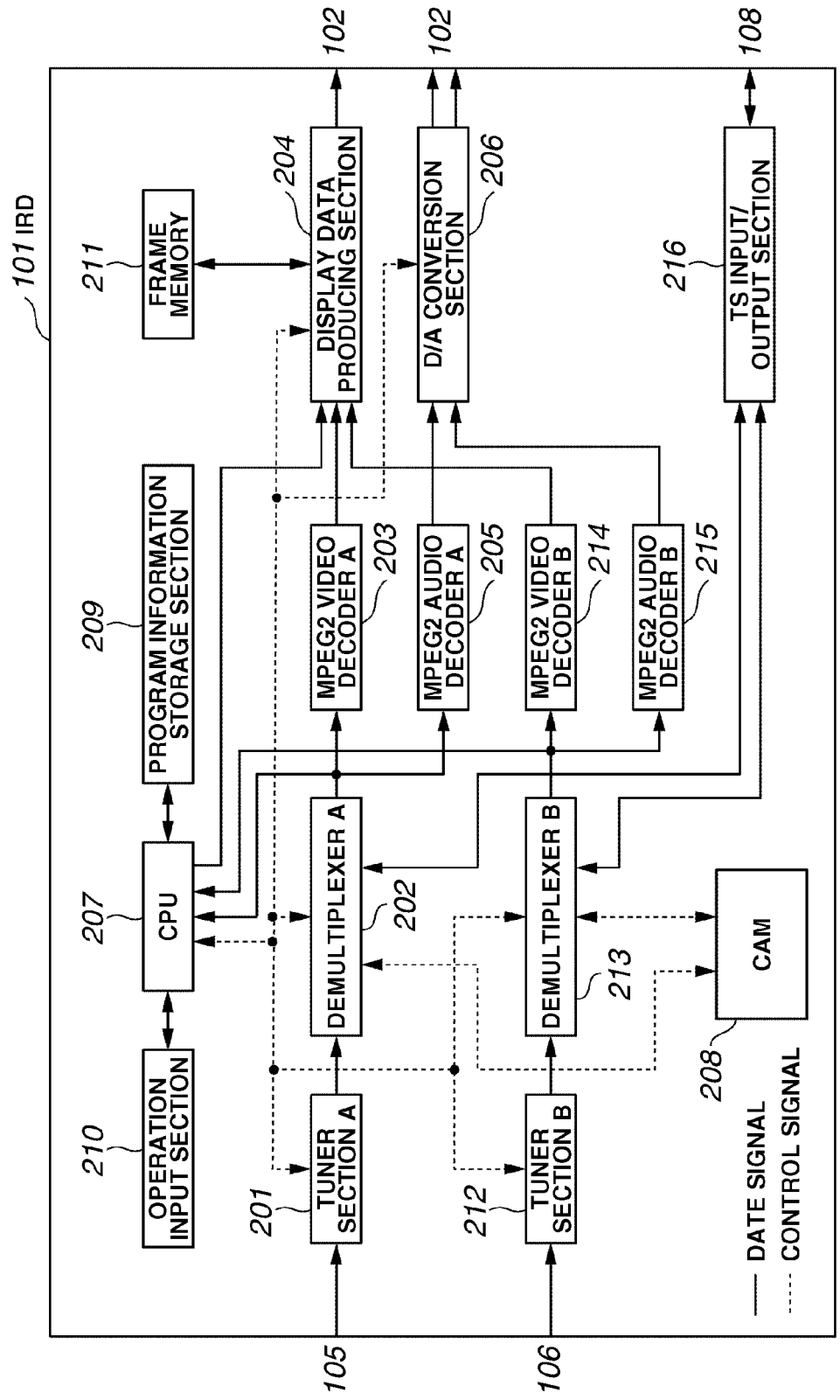
FIG. 2 is a functional block diagram illustrating an integrated receiver/decoder (IRD) illustrated in FIG. 1.

FIG. 2 is a functional block diagram of the IRD 101. The IRD 101 includes a tuner section A 201 that can receive a digital broadcast signal via the antenna A 105. The tuner section A 201 can apply demodulation processing and error-correction processing to the received signal and produce digital data formatted as a transport stream (TS).

The tuner section A 201 receives a channel selection instruction and produces TS data of a predetermined channel based on the digital broadcast signal. Furthermore, the tuner section A 201 can demodulate a transmission and multiplexing configuration control (TMCC) signal together with the TS data.

TMCC signal is a transmission and multiplexing control signal for realizing a hierarchical modulation method that can designate a modulation method or an error-correction method for each slot (unit of signal) on the transmission path. The TMCC signal can be used for a mechanism indicating transmission of an emergency warning broadcast.

A tuner section B 212 can receive a digital broadcast signal via the antenna B 106. The tuner section B 212 is functionally similar to the tuner section A 201. In the description of each exemplary embodiment of the present invention, the tuner section A 201 is referred to as a main tuner and the tuner section B 212 is referred to as a sub tuner. Each of the tuner section A 201 and the tuner section B 212 can receive a digital terrestrial broadcast signal, a digital BS broadcast signal, and a digital CS broadcast signal and can produce TS data.

A demultiplexer A 202 receives TS data output from the tuner section A 201 or a TS input/output section 216 and executes filtering processing with a packet identifier (PID) to separate the TS data into various data. The demultiplexer A 202 reads a decryption key from a conditional access module (CAM) 208 and decrypts the encrypted TS data with the key. The CAM 208 stores the decryption key to execute descrambling processing.

Similarly, a demultiplexer B 213 receives TS data output from the tuner section B 212 or the TS input/output section 216 and executes filtering processing with a packet identifier (PID) to separate the TS data into various data. An MPEG2 video decoder A 203 can decode MPEG2 image data separated by the demultiplexer A 202. An MPEG2 video decoder B 214 can decode MPEG2 image data separated by the demultiplexer B 213.

A display data producing section 204 receives an image signal decoded by the MPEG2 video decoder A 203, an image signal decoded by the MPEG2 video decoder B 214, and an image of display data created by a central processing unit (CPU) 207. The display data producing section 204 combines the received image signals using a frame memory 211 and produces a composite image signal having a format (e.g., high-definition or NTSC) corresponding to the monitor 102.

An MPEG2 audio decoder A 205 receives MPEG2 audio data from the demultiplexer A 202 and decodes the MPEG2 audio data. An MPEG2 audio decoder B 215 receives MPEG2 audio data from the demultiplexer B 213 and decodes the MPEG2 audio data. A digital-to-analog (D/A) conversion section 206 receives decoding results from the MPEG2 audio decoder A 205 and the MPEG2 audio decoder B 215 and outputs stereo audio or other audio signals to an external device.

The central processing unit (CPU) 207 is a control unit that can control various functions of the IRD 101. Table data of a program map table (PMT) and data broadcasting-related data separated by the demultiplexer A 202 and the demultiplexer B 213 are sent to the CPU 207. The CPU 207 executes processing for decrypting the received data. Furthermore, the CPU 207 executes processing for producing display information to be sent to the display data producing section 204.

More specifically, the CPU 207 can control an image drawing section (not shown) to render display information and send the display information to the display data producing section 204. Moreover, the CPU 207 can control a program information storage unit 209 to store broadcast program information. Additionally, the CPU 207 receives a TMCC signal from each of the tuner section A 201 and the tuner section B 212 and executes various processing relating to the emergency warning broadcast.

The program information storage unit 209 stores various table data processed by the CPU 207 as broadcast program information for program selection. An operation input section 210 enables a user to input various operations for broadcast reception via the remote controller 104 or an operation panel (not shown). The frame memory 211 can be used as a temporary storage of images when the display data producing section 204 combines the images.

The TS input/output section 216 outputs, to the DVR 108 connected via the digital cable 109, TS data separated by the demultiplexer A 202 and the demultiplexer B 213. The DVR 108 stores the TS data received from the TS input/output section 216. In addition, the TS input/output section 216 receives TS data from the DVR 108.

Next, digital broadcast channel selection processing is described with reference to the above-described arrangement. First, a user instructs a channel with the remote controller 104. The CPU 207 receives the channel instruction as channel information (service ID) via the operation input section 210. The CPU 207 converts the channel information into a frequency and a TSID (i.e., transport stream ID). The CPU 207 sets the frequency and the TSID to the tuner section A 201 or to the tuner section B 212. The tuner section A 201 or the tuner section B 212 receives the channel data and converts the received signal into TS data.

The demultiplexer A 202 or the demultiplexer B 213 receives the TS data converted by the tuner section 201 or 212 and separates the TS data into image data, audio data, and other data. The MPEG2 video decoder A 203 or the MPEG2 video decoder B 214 decodes the image data. The MPEG2 audio decoder A 205 or the MPEG2 audio decoder B 215 decodes the audio data. The CPU 207 applies predetermined processing to other data. When the TS data input from the tuner section 201 or 212 is an encrypted scramble signal, the demultiplexer 202 or 213 executes decryption processing with the CAM 208.

The display data producing section 204 receives the image data decoded by the video decoder 203 or 214 and converts the image data into video data for display. The D/A conversion section 206 receives the audio data decoded by the audio decoder 205 or 215 and executes D/A conversion processing. Through the conversion processing, the D/A conversion section 206 separates the audio data into a left channel signal and a right channel signal, which are sent to the monitor 102 connected to the IRD 101. Thus, the monitor 102 can display and output the video data and the audio data.

Next, digital broadcast recording (storage) processing is described with reference to the above-described arrangement. The demultiplexer A 202 or the demultiplexer B 213 receives the TS data as described in the channel selection processing. The demultiplexer A 202 or the demultiplexer B 213 converts the TS data into storage TS data. The TS input/output section 216 receives the storage TS data and applies digital transmission content protection (DTCP) or other copyright protection processing to the received TS data. The DVR 108 receives the copyright protection processed TS data via the digital cable 109 and stores the received TS data.

Next, TS data playback processing is described. Through predetermined playback execution processing, the TS input/output section 216 can input TS data from the DVR 108 via the digital cable 109. The demultiplexer A 202 or the demultiplexer B 213 can receive the TS data from the TS input/output section 216.

The demultiplexer A 202 or the demultiplexer B 213 separates the TS data into image data, audio data, and other data. The MPEG2 video decoder A 203 or the MPEG2 video decoder B 214 decodes the separated image data. The MPEG2 audio decoder A 205 or the MPEG2 audio decoder B 215 decodes the audio data. The CPU 207 applies predetermined processing to other data in the same manner as in the above-described channel selection processing.

To execute recording reservation of a television program, the CPU 207 controls execution timing for storing the program into the DVR 108. When recording reservation of a television program is designated by a user (i.e., manual setting) or based on automatic setting, the program information storage unit 209 stores the information relating to the designated program. The CPU 207 constantly monitors the time.

The CPU 207 can control the tuner section 201 or 212 to receive a designated program at the designated time with reference to a program recording start time stored in the program information storage unit 209. Trough the above-described processing, the tuner section 201 or 212 receives TS data of a predetermined channel and the DVR 108 stores the TS data according to the above-mentioned recording processing procedure.

The present invention is not limited to the functions of the IRD 101 illustrated in FIG. 2 or the control procedures and actions in the above-mentioned program channel selection or the like.

Figure 3:
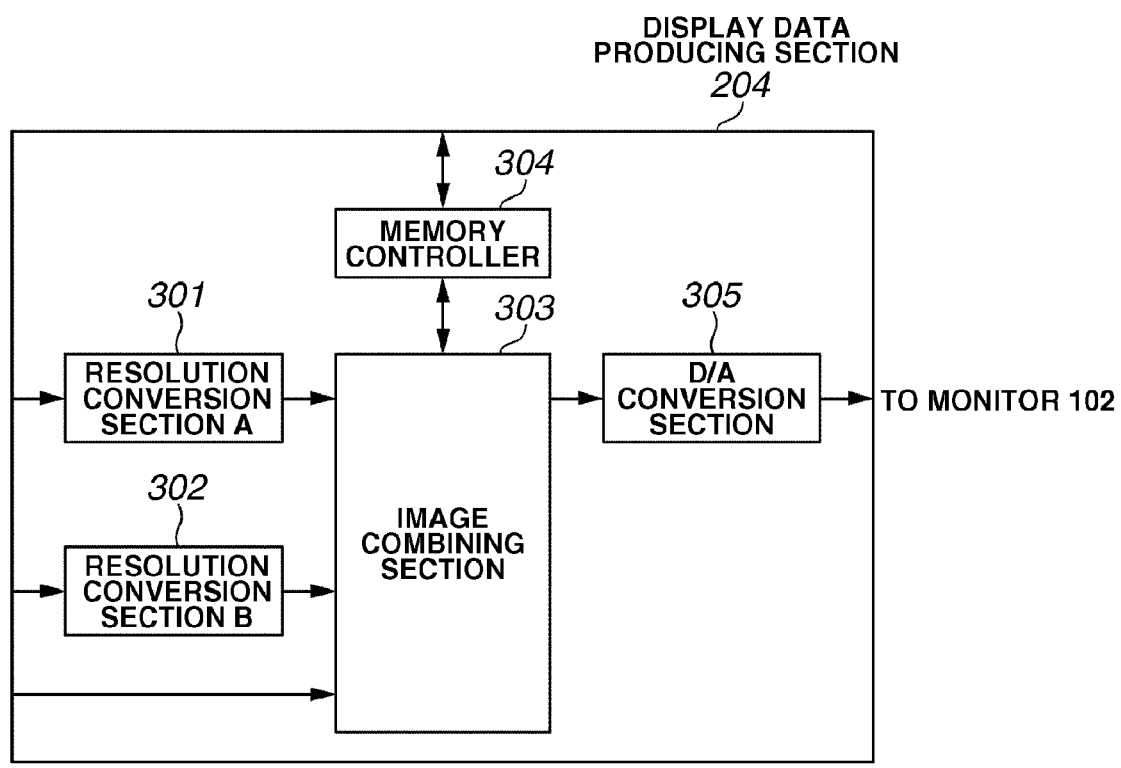
FIG. 3 is a functional block diagram illustrating a display data producing section illustrated in FIG. 2.

FIG. 3 illustrates a detailed configuration of the display data producing section 204. A resolution conversion section A 301 receives image data from the MPEG2 video decoder A 203 and converts the received data into a designated display size. A resolution conversion section B 302 receives image data from the MPEG2 video decoder B 214 and converts the received data into a designated display size.

An image combining section 303 receives image data from each of the resolution conversion section A 301 and the resolution conversion section B 302. In addition, the image combining section 303 receives display information sent from the CPU 207. The resolution conversion section A 301 and the resolution conversion section B 302 do not execute resolution conversion if conversion of resolution of the image data is not required. Alternatively, each resolution conversion section can set a conversion rate to 1 so that no substantial size change occurs.

The image combining section 303 executes processing for disposing the image data output from the resolution conversion section A 301, the image data output from the resolution conversion section B 302, and the display information sent from the CPU 207 to respective predetermined areas. The image combining section 303 can combine these image data according to a predetermined rule, using the frame memory 211. A memory controller 304 can control the frame memory 211 and input/output of image data so that the image combining section 303 can execute image layout and combination processing. The frame memory 211 temporarily stores the image data.

A digital-to-analog (D/A) conversion section 305 can convert the image data output from the image combining section 303 into a signal format corresponding to the monitor 102. Then, the D/A conversion section 305 sends the converted image data to the monitor 102.

The image combining section 303 can execute 2-screen display processing. When a user performs a 2-screen display switching operation with the remote controller 104, an operation signal is input into the operation input section 210. In response to the 2-screen display switching signal input into the operation input section 210, the CPU 207 instructs the resolution conversion section A 301 and the resolution conversion section B 302 to produce 2-screen display image data.

To realize a 2-screen display, each of the resolution conversion sections A 301 and B 302 produces a predetermined size of image data. The image combining section 303 receives the 2-screen display image data output from the resolution conversion section A 301 and the resolution conversion section B 302. The image combining section 303 combines the image data input from respective resolution conversion sections 301 and 302 using the frame memory 211, and produces a composite image in a predetermined layout. The image combining section 303 can combine the above-described image data with the display information sent from the CPU 207.

Figures 4A, 4B:
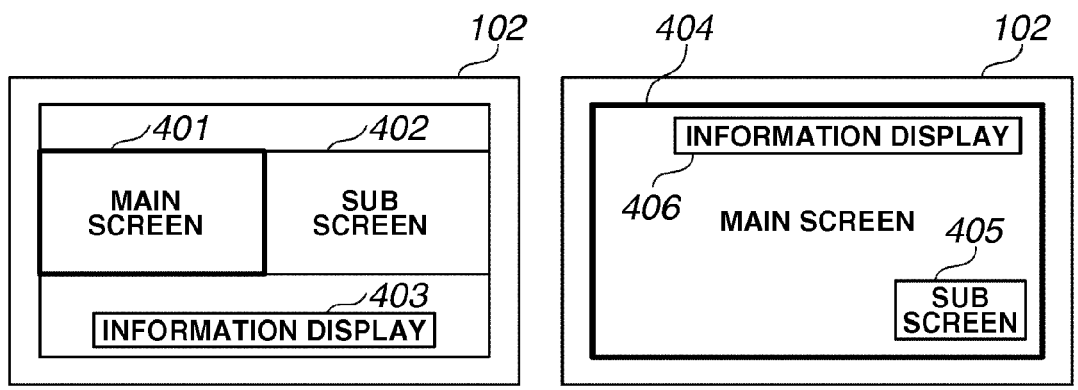
FIG. 4A is an illustration of an example of a multi-screen display.
FIG. 4B is another illustration of an example of a multi-screen display.

FIGS. 4A and 4B illustrate examples of the 2-screen display pattern. According to the example of FIG. 4A, two screens 401 and 402 are disposed in parallel to each other in the display area of the monitor 102. The layout pattern illustrated in FIG. 4A is referred to as "picture-out-picture."

The image data of a television program of a channel displayed before executing the 2-screen display processing is converted into a predetermined size and disposed in the main screen 401. The image data of a television program of another channel designated by a predetermined operation is converted into a predetermined size and disposed in the sub screen 402. The layout pattern of the main screen 401 and the sub screen 402 is not limited to a particular pattern. For example, the sub screen 402 can be located at the left side of the display area of the monitor 102.

The IRD 101 of the first exemplary embodiment receives broadcast data for the main screen by the tuner section A 201 and broadcast data for the sub screen by the tuner section B 212. However, the present invention is not limited to the aforementioned allocation in the relationship between the dissected screens and tuner sections. For example, one screen can be used to display the recording image data stored in the DVR 108.

In FIG. 4A, the display information sent from the CPU 207 is displayed in an information display area 403. The display area of the display information can be changed to any other location. Any other method can be used to combine plural image elements. For example, transparent compositing (alpha blending) processing can be used to combine plural image elements. When a 2-screen display pattern is selected, the IRD 101 outputs audio data corresponding to the image data displayed in the main screen 401. However, the IRD 101 can output audio data corresponding to the image data displayed in the sub screen 402.

FIG. 4B illustrates another 2-screen display pattern, according to which a sub screen 405 is superimposed on a main screen 404 in the display area of the monitor 102. The layout pattern illustrated in FIG. 4B is referred to as "picture-in-picture." The main screen 404 has a screen size comparable to a displayable area of the monitor 102 in an ordinary 1-screen display pattern. The image data of a television program of a channel displayed before executing the 2-screen display processing is converted into a predetermined size and disposed in the main screen 404. The image data of a television program of another channel designated by a predetermined operation is converted into a predetermined size and disposed in the sub screen 405.

The image data displayed in the sub screen 405 is combined, without any transparency processing, with the image data displayed in the main screen 404. The image data displayed in the main screen 404 can be switched to the image data displayed in sub screen 405. In the present embodiment, the IRD 101 is equipped with a setting function for defining a setting for causing the image of a channel received by one of the tuner section A 201 and the tuner section B 212 to be displayed in the main screen 404 and causing the image of a channel received by the other tuner section to be displayed in the sub screen 405. Note that, in other exemplary embodiments to be described below, the IRD 101 is also equipped with a similar setting function. The layout area of the sub screen 405 can be changed to any other location. The display information sent from the CPU 207 can be displayed in an information display area 406. The IRD 101 outputs audio data corresponding to the image data displayed in the main screen 404. However, the IRD 101 can output audio data corresponding to the image data displayed in the sub screen 405.

Subsequently, emergency warning broadcast reception processing is described. The emergency warning broadcast is a special television program broadcasted from Japan Broadcasting Corporation (NHK) or private commercial broadcast stations, for example, in an event of accident or natural disaster that may give serious influence to the human life or properties, which can be classified into the following three categories:

(1) earthquake warning issued in the Tokai region (first class);
(2) evacuation instruction issued by a municipal head (first class); and
(3) tsunami warning (second class).

The type of broadcasting is not limited to analog television broadcasting and can be digital broadcasting or radio broadcasting.

In the case of digital broadcasting, although not limited to an emergency warning broadcast, each of the antenna A 105 and the antenna B 106 receives a broadcast signal. Each of the tuner section A 201 and the tuner section B 212 produces a TS signal and a TMCC signal, as described above. TMCC signal includes the following contents.

| Information Name | Size | Contents |
| --- | --- | --- |
| Change Instruction | 5 bits | Counter responding to change of TMCC signal |
| Transmission Mode/Slot Information | 40 bits | Indicating modulation method of intra-error correction coded signal resulting from transmitted main signal, combination of encoding rate in the intra-error correction coding, and number of used slots |
| Relative TS/Slot Information | 144 bits | Area transmitting allocated relative TS number |
| Relative TS/TSID Correspondence Table | 128 bits | Area indicating relationship between TSID discriminating coded signal and relative TS number for effectively transmitting plural TS data in the same frequency |
| Transmission/ Reception Control Information | 5 bits | Activation control signal (for emergency warning signal) |
| Extended Information | 62 bits | TMCC extended area |

When an emergency warning is transmitted from a broadcast station, change instruction information included in a TMCC signal is incremented by 1. Then, an activation control signal (a leading 1 bit of 5-bit transmission/reception control information) is changed to "1" (indicating transmission of an emergency warning broadcast). In the IRD 101, the CPU 207 constantly monitors the activation control signal and can recognize the presence of any emergency warning when the activation control signal is changed.

In response to a transmitted emergency warning, the CPU 207 executes the following processing. First, the demultiplexer 202 or 213 separates an emergency information descriptor included in a program map table (PMT) of the service information (SI) data included in the TS data input from the tuner section 201 or 212.

SI data includes broadcast program information for forming an electronic program guide (EPG). The PMT stores image and audio packet identifiers included in the TS data. The CPU 207 analyzes the separated emergency information descriptor, and obtains service_ID, start_end_flag, signal_level, and area_code information from the emergency information descriptor. The CPU 207 can designate a broadcasting channel based on the service_ID information. The CPU 207 can determine whether an emergency warning broadcast is on the air with reference to the start_end_flag information.

Furthermore, the CPU 207 can determine whether the emergency warning broadcast is a first-class broadcasting or a second-class broadcasting with reference to the signal_level information. The CPU 207 can identify a broadcast target area with reference to the area_code information. The IRD 101 can determine and execute an operation during an emergency warning broadcast based on the above-mentioned control information.

Figure 5:
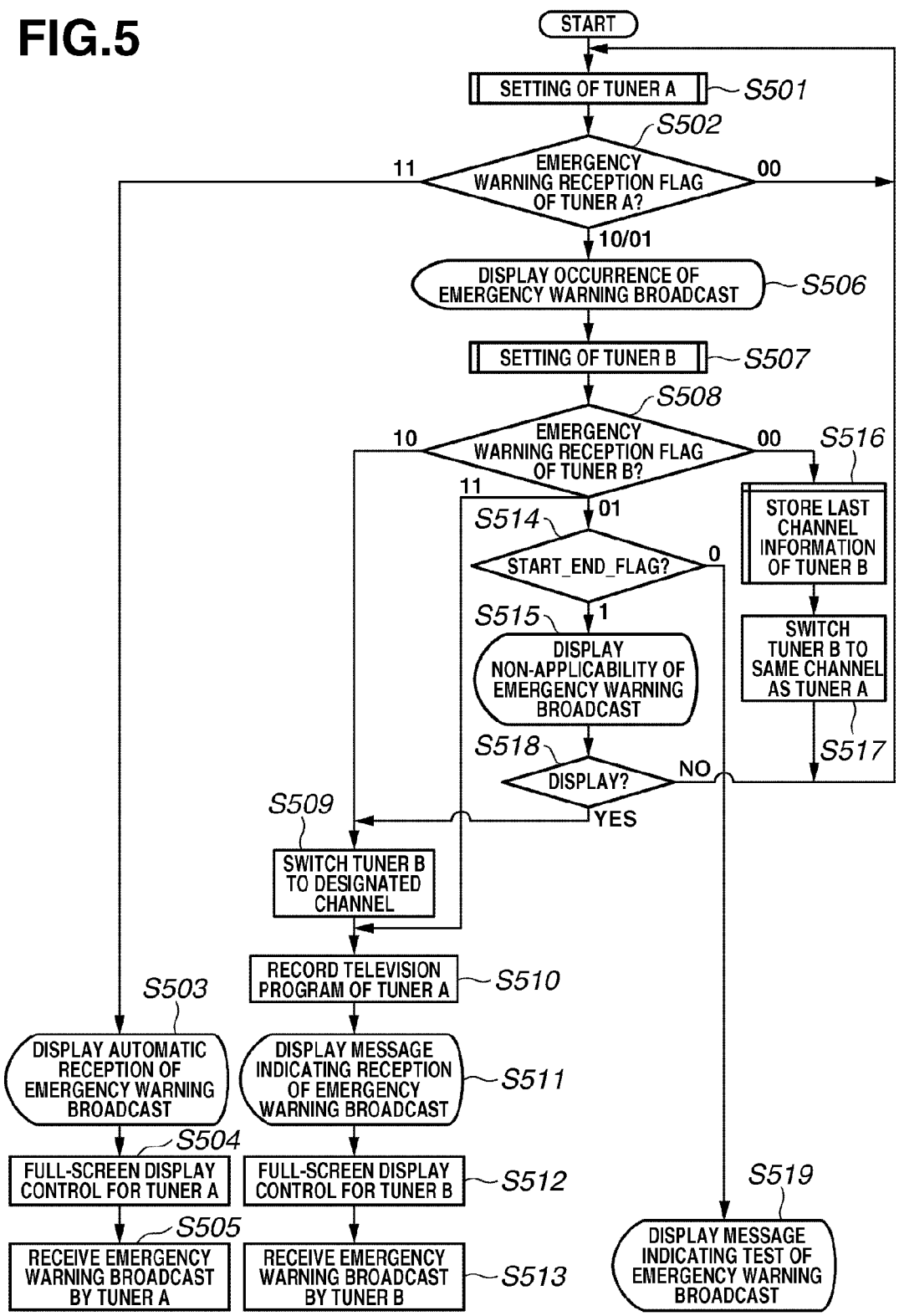
FIG. 5 is a flowchart illustrating a processing procedure according to a first exemplary embodiment of the present invention.
Figure 6:
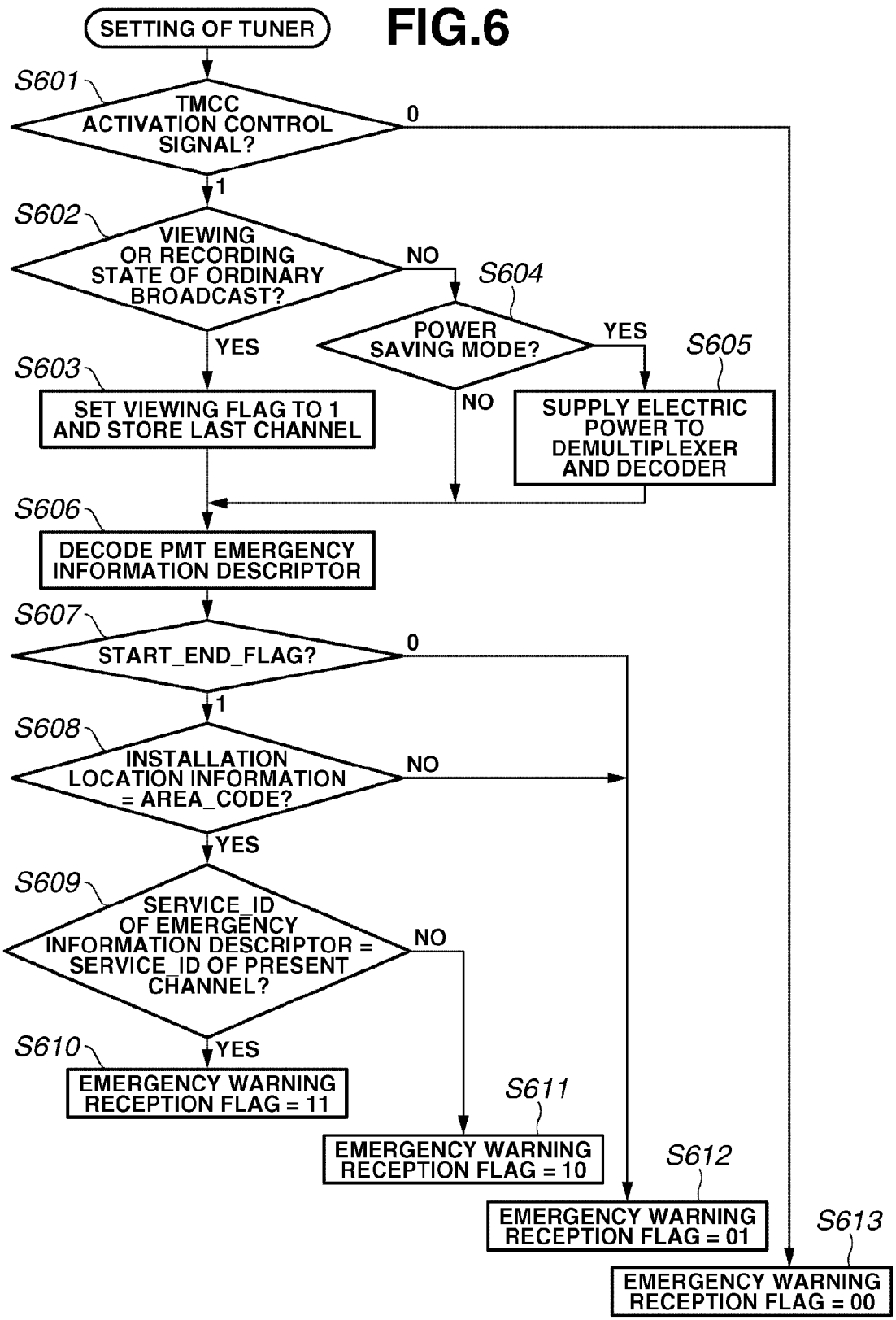
FIG. 6 is a flowchart illustrating a procedure for analyzing a transmission and multiplexing configuration control (TMCC) signal according to the first exemplary embodiment.

FIGS. 5 and 6 are flowcharts illustrating emergency warning broadcast reception processing according to the first exemplary embodiment, which is executed by the CPU 207 in the IRD 101 to control the functional sections illustrated in FIG. 2.

In the following description, both the tuner section A 201 and the tuner section B 212 are used to display two broadcast programs in a 2-screen pattern. In a broadcast of emergency warning, the display screen is switched to a full-screen display. In FIG. 5, the tuner section A 201 of the IRD 101 is ready for receiving an ordinary broadcast. In step S501, the tuner section A 201 executes processing for producing a TS signal and a TMCC signal from the broadcast data.

FIG. 6 is a flowchart illustrating detailed actions of each tuner section (i.e., tuner section A 201 or tuner section B 212) performed in step S501.

In step S601 of FIG. 6, each tuner section executes TMCC demodulation processing for separating a TMCC signal from broadcast data. The CPU 207 receives the TMCC signal and determines whether an activation control signal bit of the transmission/reception control information of the TMCC signal is "1." If the activation control signal bit is "1," the processing flow proceeds to step S602. If the activation control signal bit is "0," the processing flow proceeds to step S613.

In step S602, to check the present state of the IRD 101, the CPU 207 determines whether the IRD 101 is in a viewing or recording state of an ordinary broadcast. If the IRD 101 is in a viewing or recording state of an ordinary broadcast (i.e., YES in step S602), the processing flow proceeds to step S603. Otherwise, the processing flow proceeds to step S604.

In step S603, the CPU 207 stores a channel and a broadcast system of an ordinary television program presently received by the tuner section into a predetermined storage unit. The CPU 207 can restart reception of the ordinary television program with reference to the stored information, when an emergency warning broadcast ends. The CPU 207 sets a viewing flag to "1" (indicating that the tuner section is in a viewing state) and stores the flag value into a predetermined storage unit. Then, the processing flow proceeds to step S606.

In step S604, i.e., when the IRD 101 is not in a viewing or recording state of an ordinary broadcast, the CPU 207 determines whether the IRD 101 is in a power saving mode. If the IRD 101 is in a power saving mode (i.e., YES in step S604), the processing flow proceeds to step S605. Otherwise, the processing flow proceeds to step S606. The functional sections in the IRD 101, except each tuner section, the CPU 207, and the operation input section 210, receive no electric power in the power saving mode. In step S605, the CPU 207 executes processing for supplying electric power to each demultiplexer and each decoder.

In step S606, the CPU 207 decodes and analyzes an emergency information descriptor in the PMT. Subsequently, the processing flow proceeds to step S607. In step S607, the CPU 207 determines the state of start_end_flag included in the emergency information descriptor analyzed in step S606. If the state of start_end_flag is "1", the CPU 207 determines that an emergency warning broadcast is on the air. The processing flow then proceeds to step S608. If the state of start_end_flag is "0", the CPU 207 determines that no emergency warning broadcast is on the air. The processing flow then proceeds to step S612.

In step S608, the CPU 207 determines whether installation location information corresponds to the area_code. The installation location is set beforehand in the IRD 101. The area_code is included in the emergency information descriptor analyzed in step S606. If the CPU 207 determines that the area_code corresponds to the installation location information of the IRD 101 (i.e., YES in step S608), the processing flow proceeds to step S609. If the area_code does not correspond to the installation location information of the IRD 101 (i.e., NO in step S608), the processing flow proceeds to step S612.

In step S609, the CPU 207 determines whether the service_ID of the emergency information descriptor corresponds to the service_ID of the channel presently receiving a television program. If the CPU 207 determines that the service_ID of the emergency information descriptor corresponds to the service_ID of the channel presently receiving a television program (i.e., YES in step S609), the processing flow proceeds to step S610. If the service_ID of the emergency information descriptor does not correspond to the service_ID of the channel presently receiving a television program (i.e., NO in step S609), the processing flow proceeds to step S611.

When the service_ID of the emergency information descriptor corresponds to the service_ID of the channel presently receiving a television program, the emergency warning broadcast is broadcast on the channel presently receiving a television program. The CPU 207 stores an emergency warning reception flag "11" (indicating interruption of a present program viewing or recording) into a predetermined storage unit (refer to step S610).

When the service_ID of the emergency information descriptor does not correspond to the service_ID of the channel presently receiving a television program, the emergency warning broadcast is broadcast on a channel other than the channel presently receiving a television program. The CPU 207 stores an emergency warning reception flag "10" (indicating occurrence of a channel selection action and interruption of a program viewing) into a predetermined storage unit (refer to step S611).

In step S612, the CPU 207 stores an emergency warning reception flag "01", which indicates that the received emergency warning broadcast is a test broadcast or an emergency warning broadcast applied to a region not including the installation location of the IRD 101, into a predetermined storage unit.

In step S613, the CPU 207 stores an emergency warning reception flag "00", which indicates no reception of an emergency warning broadcast, into a predetermined storage unit. After completing the above-described processing, the processing flow proceeds to step S502 of FIG. 5.

In step S502, the CPU 207 determines the state of emergency warning reception flag described in FIG. 6. If the flag is "11", the processing flow proceeds to step S503. If the flag is "10" or "01", the processing flow proceeds to step S506. If the flag is "00", the processing flow returns to step S501. In the present embodiment, as the 2-screen display processing is executed as described above, the determination at step S502 is applied to the broadcasting received by the tuner section A 201.

Figure 7A:
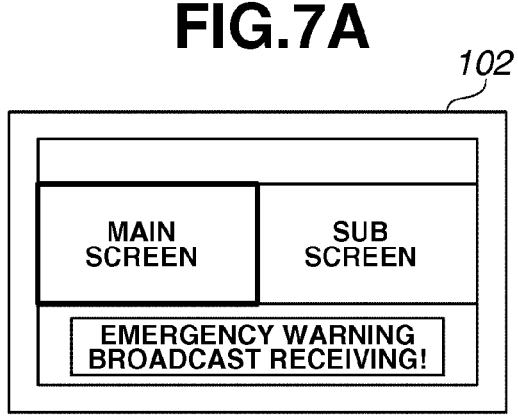
FIGS. 7A through 7F are illustrations of exemplary screens displayed in emergency warning broadcast reception processing.

In step S503, the CPU 207 causes the image drawing section (not shown) to render display information indicating automatic reception of an emergency warning broadcast. Then, the CPU 207 executes the processing for displaying the rendered display information in the information display area 403 of FIG. 4A or 406 of FIG. 4B. FIG. 7A illustrates a 2-screen display pattern of "picture-out-picture" images displayed on the monitor 102 in this case.

However, the display information can be also rendered as "picture-in-picture" images and displayed in a predetermined information display area. When the emergency warning reception flag is "11", the present emergency warning broadcast is applied to the installation location of the IRD 101. Therefore, the display information is a message indicating a highest warning level, such as "Emergency Warning Broadcast Receiving!"

Figure 7B:
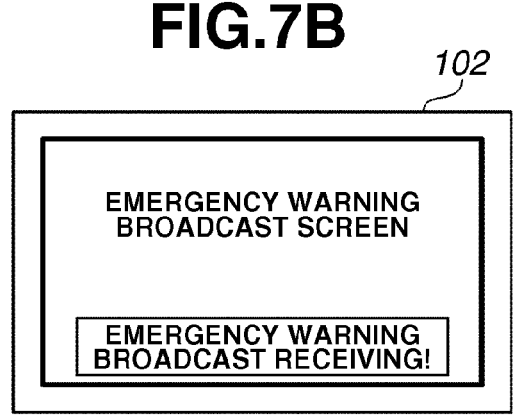

Subsequently, the processing flow proceeds to step S504. In step S504, the CPU 207 performs a control for a full-screen display of the emergency warning broadcast received by the tuner section A 201 so that the contents of the present emergency warning broadcast can be transmitted to users. FIG. 7B illustrates an exemplary full-screen display pattern used in this case. Then, in step S505, the tuner section A 201 receives the emergency warning broadcast and the monitor 102 displays the contents of the received emergency warning broadcast.

In another embodiment, a process of activating the DVR 108 to record a television program received by the tuner section B 212 and displayed on the monitor 102 can be inserted between step S503 and step S504. With this processing, even when a television program is interrupted by the emergency warning broadcast, a user can later view the program as received by the tuner section B 212.

If in step S502 the state of the emergency warning reception flag is "10" or "01," the processing flow proceeds to step S506. In step S506, the CPU 207 causes the image drawing section (not shown) to render display information indicating reception of an emergency warning broadcast.

Figure 7C:
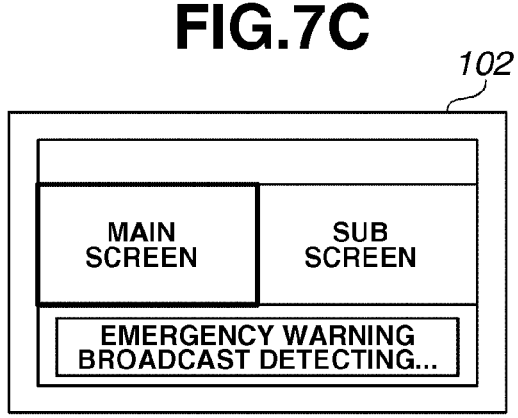

Then, the CPU 207 executes the processing for displaying the rendered display information in the information display area 403 of FIG. 4A or 406 of FIG. 4B. FIG. 7C illustrates a 2-screen display pattern of "picture-out-picture" images displayed on the monitor 102 in this case.

However, the display information can be also rendered as "picture-in-picture" images and displayed in a predetermined information display area. When the emergency warning reception flag is "10" or "01", a channel selection action is performed for reception of the emergency warning broadcast or the emergency warning broadcast is applied to a region not including the installation location of the IRD 101. Therefore, the display information is a message indicating a lower warning level, such as "Emergency Warning Broadcast Detecting."

Subsequently, in step S507, the CPU 207 executes the processing for the tuner section B 212 described with reference to FIG. 6. In the present embodiment, the tuner section B 212 receives a broadcast displayed on the sub screen while the tuner section A 201 receives a broadcast displayed on the main screen.

In step S508, the CPU 207 determines the state of an emergency warning reception flag in the tuner section B 212. If the emergency warning reception flag of the tuner section B 212 is "00", the processing flow proceeds to step S516. In step S516, the CPU 207 stores information relating to a broadcast system and a channel presently received by the tuner section B 212 into a predetermined storage unit. Subsequently, the processing flow proceeds to step S517. In step S517, the CPU 207 switches the channel of the tuner section B 212 to a channel received by the tuner section A 201.

The reason why the channel of the tuner section B 212 is switched to the channel received by the tuner section A 201 is as follows. When the processing flow proceeds to step S517, the emergency warning reception flag received by the tuner section A is "10" or "01" and the emergency warning reception flag received by the tuner section B is "00." When a TMCC signal received by the tuner section A 201 is a test broadcast (i.e., FLAG "01"), a required display is "Test of Emergency Warning Broadcast" or "Emergency Warning Broadcast of Another Region."

However, when the TMCC signal received by the tuner section A 201 indicates that the emergency warning broadcast is received by another channel (in case of FLAG "10"), a channel selection action is required to let a user view the emergency warning broadcast. Hence, in the present embodiment, if the emergency warning reception flag received by the tuner section A 201 is "10", the CPU 207 switches the channel of the tuner section B 212 to a channel corresponding to a service_ID of the emergency information descriptor.

After the channel of the tuner section B 212 is switched to the channel of the tuner section A 201 in step S517, the processing flow returns to step S501. Then, through the determination processing in step S508, the processing flow proceeds to step S509. Through this processing, the tuner section B 212 can receive an emergency warning broadcast.

If in step S508 the emergency warning reception flag of the tuner section B 212 is "01", the processing flow proceeds to step S514. In step S514, the CPU 207 analyzes the start_end_flag of the emergency information descriptor. If the start_end_flag is "1", the present emergency warning broadcast is an emergency warning broadcast applied to another region. In this case, the processing flow proceeds to step S515.

Figure 7D:
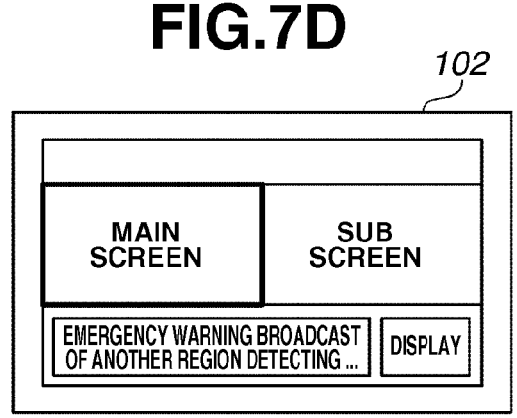

In step S515, the CPU 207 causes the monitor 102 to display a message indicating that the present emergency warning broadcast is applied to another region. FIG. 7D illustrates an example of a display pattern used in this case. In step S518, the CPU 207 determines whether a display of the present emergency warning broadcast is required. If a user requests the display of the present emergency warning broadcast applied to another region, the processing flow proceeds to step S509.

Figure 7E:
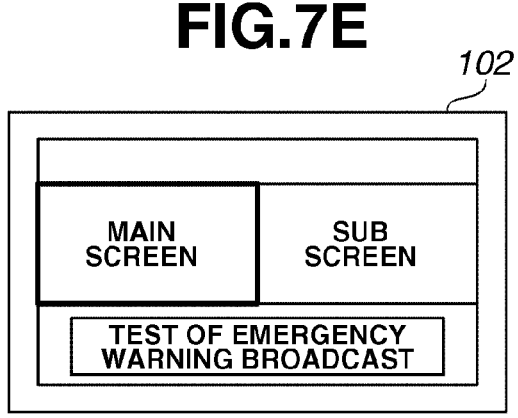

If in step S514 the start_end_flag is "0", the present emergency warning broadcast is a test broadcast. The processing flow proceeds to step S519. The CPU 207 causes the monitor 102 to display a message indicating a "test of emergency warning broadcast" in the information display area as illustrated in FIG. 7E, without changing the 2-screen display pattern (i.e., without interrupting user's viewing a television program).

If in step S508 the emergency warning reception flag of the tuner section B 212 is "10", the processing flow proceeds to step S509. In this case, the present channel of the tuner section B 212 is different from the channel receiving the emergency warning broadcast. Thus, in step S509, the CPU 207 controls the tuner section B 212 to select a channel indicated by the service_ID of the emergency information descriptor. Subsequently, the processing flow proceeds to step S510.

In step S510, the CPU 207 causes the DVR 108 to record a television program currently received by the tuner section A 201, because user's viewing the television program of the tuner section A 201 is interrupted by the display of the emergency warning broadcast selected by the tuner section B 212. Subsequently, in step S511, the CPU 207 causes the monitor 102 to display a message "emergency warning broadcast receiving!" as illustrated in FIG. 7A. Then, the processing flow proceeds to step S512.

In step S512, the CPU 207 determines a display size of video data received by the tuner section B 212 so that the monitor 102 can realize a full-screen display of the emergency warning broadcast received by the tuner section B 212.

Finally, in step S513, the tuner section B 212 receives broadcast data of a channel corresponding to the service_ID of the emergency information descriptor and the monitor 102 displays the contents of the emergency warning broadcast.

If in step S508 the emergency warning reception flag of the tuner section B 212 is "11", the emergency warning broadcast is received by the present channel of the tuner section B 212. The processing flow proceeds to step S510.

As described above, an emergency warning broadcast may be raised in a situation where a user is viewing different television programs with two tuners in a 2-screen display pattern. In such a case, if the emergency warning broadcast is important for the user, the broadcast receiving system of the present embodiment can realize a full-screen display of the emergency warning broadcast to let the user know the contents of the emergency warning.

Furthermore, the broadcast receiving system of the present embodiment can automatically execute the processing for recording a television program currently viewed by a user in the event that the display of the emergency warning broadcast forcibly interrupts the user's viewing of the television program. Thus, the present embodiment provides for the usability of the broadcast receiving system by transmitting an emergency warning to a user while automatically recording the television program currently being viewed by the user.

Second Exemplary Embodiment

Next, a second exemplary embodiment of the present invention is described. The second exemplary embodiment is similar to the first exemplary embodiment in system configuration (refer to FIGS. 1 and 2). The first exemplary embodiment realizes a full-screen display of an emergency warning broadcast applied to another region using the tuner section B 212 if a user requests a display of the emergency warning broadcast.

However, a user may not wish the television program being viewed on a main screen to be forcibly interrupted by the emergency warning broadcast of another region. The second exemplary embodiment is different from the first exemplary embodiment in the processing executed in response to reception of an emergency warning broadcast applied to another region during a 2-screen display of television programs.

Figure 8:
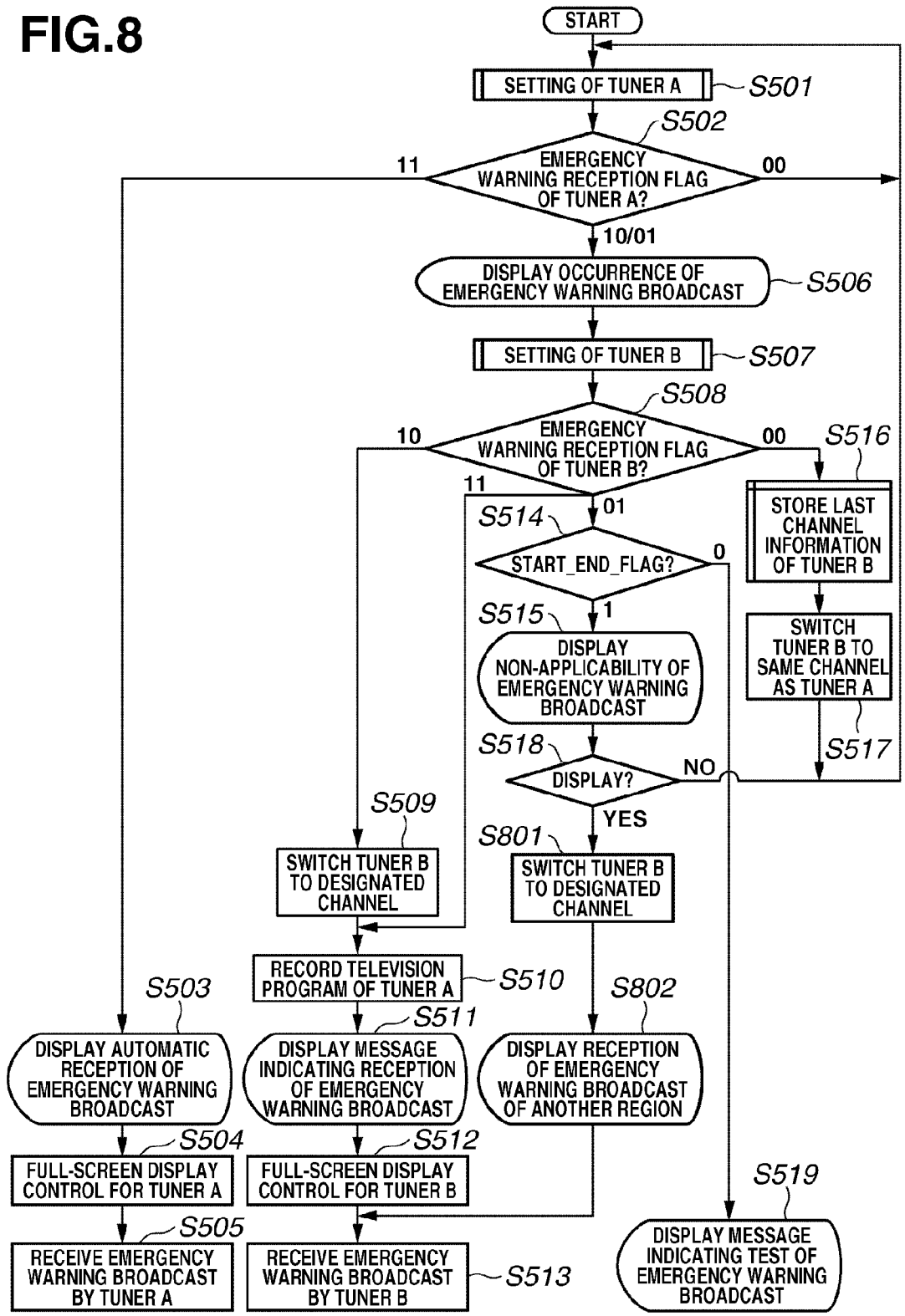
FIG. 8 is a flowchart illustrating a processing procedure according to a second exemplary embodiment of the present invention.

FIG. 8 is a flowchart illustrating emergency warning broadcast reception processing according to the second exemplary embodiment. FIG. 8 includes the same processing as FIG. 5 and, therefore, uses the same step numbers, although the same processing is not described again in the present embodiment.

If in step S515 the emergency warning broadcast received by the tuner section B 212 is an emergency warning broadcast applied to another region, the CPU 207 causes the monitor 102 to display a message indicating that the present emergency warning broadcast is applied to another region as illustrated in FIG. 7D. In step S518, the CPU 207 determines whether a display of the present emergency warning broadcast is required. If a user requests the display of the present emergency warning broadcast applied to another region, the processing flow proceeds to step S801.

In this case, the present channel of the tuner section B 212 is different from the channel receiving the emergency warning broadcast. Thus, in step S801, the CPU 207 controls the tuner section B 212 to select a channel indicated by the service_ID of the emergency information descriptor. Subsequently, the processing flow proceeds to step S802.

Figure 7F:
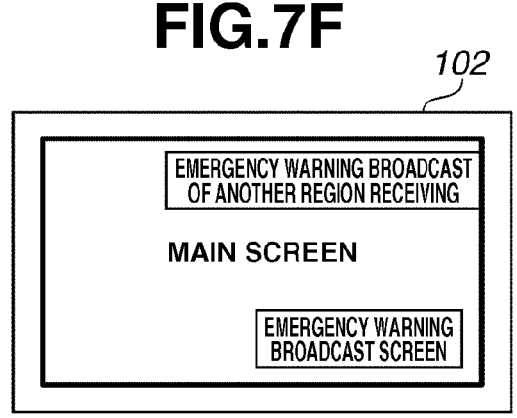

In step S802, the CPU 207 causes the monitor 102 to display a message indicating reception of an emergency warning broadcast of another region in the information display area. Subsequently, the processing flow proceeds to step S513. The tuner section B 212 receives a channel corresponding to the service_ID of the emergency information descriptor, and the monitor 102 displays the contents of the emergency warning broadcast. FIG. 7F illustrates an example of a 2-screen display of "picture-in-picture" images displayed on the monitor 102 in steps S802 and step S513.

As described above, an emergency warning broadcast may occur in a situation where a user is viewing different television programs with two tuners in a 2-screen display pattern. If the received emergency warning broadcast is an emergency warning broadcast applied to another region, the broadcast receiving system of the present embodiment displays the emergency warning broadcast on the sub screen without interrupting a television program displayed on the main screen.

Thus, the present embodiment allows a user to continue viewing a television program displayed on the main screen while recognizing the contents of the emergency warning broadcast applied to another region.

Third Exemplary Embodiment

Next, a third exemplary embodiment of the present invention is described. The third exemplary embodiment is similar to the first exemplary embodiment in system configuration (refer to FIGS. 1 and 2). The above-described first and second exemplary embodiments presume an occurrence of an emergency warning broadcast in a situation where a user is viewing different television programs with two tuners in a 2-screen display pattern.

The third exemplary embodiment is different from the first and second exemplary embodiments in that the broadcast receiving system controls the reception processing of an emergency warning broadcast based on the state of use in each tuner.

Figure 9:
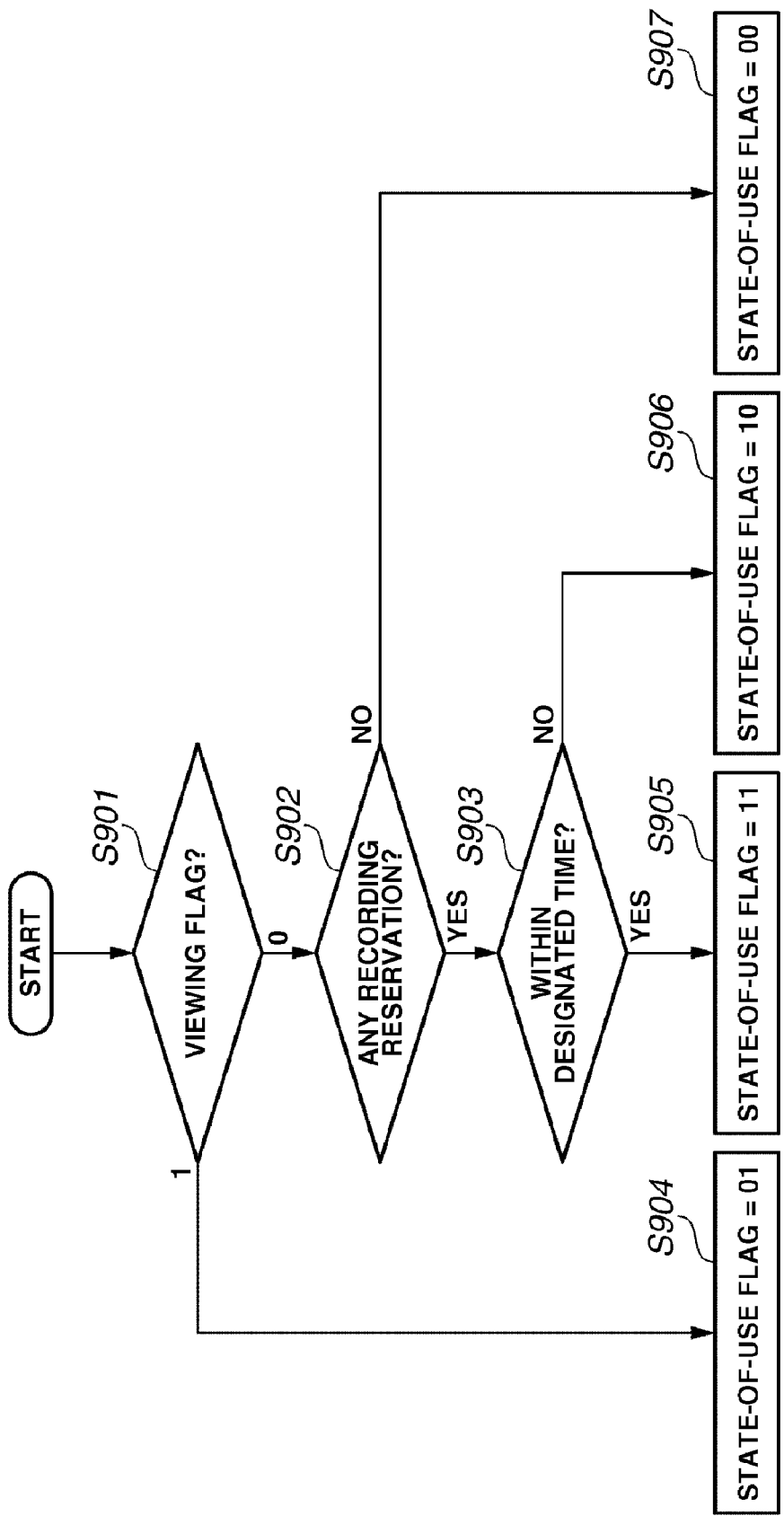
FIG. 9 is a flowchart illustrating a tuner state-of-use identifying procedure according to a third exemplary embodiment of the present invention.

FIG. 9 is a flowchart illustrating processing for determining the state of use in each tuner section. To execute the processing illustrated in FIG. 9, the CPU 207 controls the functional sections illustrated in FIG. 2. FIG. 9 relates to the processing for detecting a state of use of the tuner section and a state of emergency warning broadcast reception illustrated in FIG. 6. The processing illustrated in FIG. 9 is executed for each tuner section. Although the third exemplary embodiment describes the processing performed in the tuner section A 201, similar processing is performed in the tuner section B 212.

In step S901, the CPU 207 determines whether the viewing flag set in step S603 of FIG. 6 is "1." If the viewing flag is "1", i.e., when the tuner section is presently used, the processing flow proceeds to step S904. For example, the tuner section may be used for displaying a television program on the monitor 102 or recording a television program on the DVR 108. In step S904, the CPU 207 sets a state-of-use flag "01" indicating that the tuner section is presently used and terminates the processing of this routine. The set flag can be stored in a predetermined storage unit.

If in step S901 the viewing flag is "0", i.e., when the tuner section is not presently used, the processing flow proceeds to step S902. In step S902, the CPU 207 determines whether a recording reservation of a television program using the tuner section is set by a user. If there is no program recording reservation, the processing flow proceeds to step S907. In step S907, the CPU 207 sets a state-of-use flag "00" indicating that the tuner section is not presently used and will not be used for a while. Then, the CPU 207 terminates the processing of this routine.

If in step S902 any program recording reservation using this tuner section is set, the processing flow proceeds to step S903. In step S903, the CPU 207 determines whether the scheduled program recording starts within a predetermined/designated setting time. The setting time is, for example, 30 minutes. In other words, in step S903, the CPU 207 executes the processing for determining whether the tuner section will be used for program recording even if the tuner section is not presently used.

If in step S903 the CPU 207 determines that the program recording starts within the setting time, the processing flow proceeds to step S905. In step S905, the CPU 207 sets a state-of-use flag "11" indicating that the tuner section will be used for a scheduled program recording. Then, the CPU 207 terminates the processing of this routine.

If in step S903 the CPU 207 determines that the program recording does not start within the setting time, the processing flow proceeds to step S906. In step S906, the CPU 207 sets a state-of-use flag "10" indicating that the program recording by the tuner section does not start within the setting time. Then, the CPU 207 terminates the processing of this routine.

The CPU 207 repeatedly executes the processing illustrated in FIG. 9 at predetermined time intervals.

By repeatedly executing the processing of FIG. 9, the CPU 207 can promptly detect a change of the viewing state, a change of the presence of a program recording, and a change/cancellation of a program recording reservation. The CPU 207 can reset the viewing state flag in a short period of time.

Figure 10:
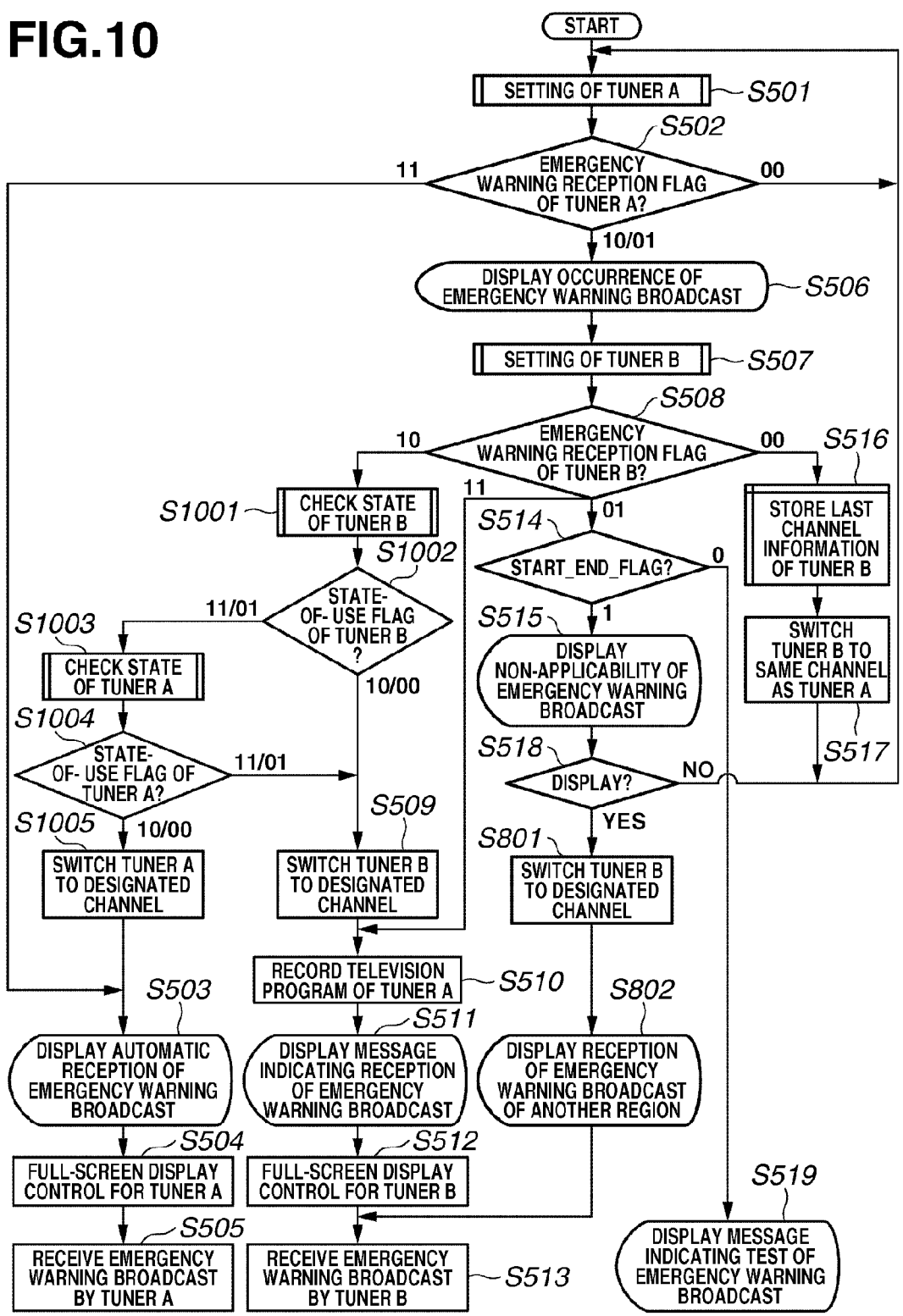
FIG. 10 is a flowchart illustrating a processing procedure according to the third exemplary embodiment of the present invention.

FIG. 10 is a flowchart illustrating emergency warning broadcast reception processing according to the third exemplary embodiment. The above-described first and second exemplary embodiments presume that a user is viewing different television programs with two tuners in a 2-screen display pattern.

However, the user's viewing style is not limited to a particular pattern in the third exemplary embodiment. FIG. 10 includes the same processing as FIGS. 5 and 8 and, therefore, uses the same step numbers, although the same processing is not described again in the present embodiment.

In step S1001, the CPU 207 checks the state-of-use flag of the tuner section B 212 according to the processing described in the FIG. 9. Then, the processing flow proceeds to step S1002. In step S1002, the CPU 207 determines whether the state-of-use flag of the tuner section B 212 is "11", "01", "10", or "00." If the state-of-use flag is "11" or "01", the tuner section B 212 is within the setting time and is either being used or will be used for viewing or recording. In this case, the processing flow proceeds to step S1003. If the state-of-use flag is "10" or "00", there is no recording reservation using the tuner section B 212 or a reserved recording of the tuner section B 212 does not start within the setting time. In this case, the processing flow proceeds to step S509.

In step S1003, the CPU 207 checks the state-of-use flag of the tuner section A 201 according to the processing described in the FIG. 9. Then, the processing flow proceeds to step S1004. In step S1004, the CPU 207 determines whether the state-of-use flag of the tuner section A 201 is "11", "01", "10", or "00."

If the state-of-use flag of the tuner section A 201 is "11" or "01", the tuner section A 201 is within the setting time and is being used or will be used for viewing or recording. In this case, the processing flow proceeds to step S509.

As mentioned above, in each exemplary embodiment of the present invention, the tuner section A 201 is used as a main tuner and the tuner section B 212 is used as a sub tuner. Accordingly, the tuner section B 212 is preferably used to receive an emergency warning broadcast if the tuner section A 201 is presently used or will be used. However, if in step S502 the state of the emergency warning reception flag of the tuner section A 201 is "11" (i.e., when a received emergency warning requires a channel selection action), the tuner section A 201 can be used to receive the emergency warning broadcast.

On the other hand, if the state of the emergency warning reception flag of the tuner section A 201 is "10" or "01", the present embodiment receives an emergency warning broadcast even when the tuner section B 212 is presently used or will be used. Thus, a user's viewing of a broadcast program using the tuner section A 201 is not interrupted. Therefore, when the state-of-use flag of the tuner section A 201 is "11" or "01", the processing flow proceeds to step S509.

If in step S1004 the state-of-use flag of the tuner section A 201 is "10" or "00", there is no recording reservation using the tuner section A 201 or a reserved recording of the tuner section A 201 does not start within the setting time. Namely, the tuner section B 212 is presently used or will be used, while the tuner section A 201 is not presently used and will not be used for a while.

In this case, the tuner section A 201 (i.e., main tuner) can be used to receive an emergency warning broadcast because a viewer is presently viewing a program using the tuner section B 212 or expecting a program recording using the tuner section B 212. In this case, the processing flow proceeds to step S1005.

In step S1005, the CPU 207 controls the tuner section A 201 to select a channel indicated by the service_ID of the emergency information descriptor. Subsequently, through the above-described processing of steps S503 and S504, the processing flow proceeds to step S505. Then, the CPU 207 terminates the processing of this routine. If in step S1004 the state-of-use flag of the tuner section A 201 is "11" or "01", or if in step S1002 the state-of-use flag of the tuner section B 212 is "10" or "00", the processing flow proceeds to step S509.

In step S509, the CPU 207 controls the tuner section B 212 to select a channel indicated by the service_ID of the emergency information descriptor. Subsequently, the processing flow proceeds to step S510. In the aforementioned first and second exemplary embodiments, the CPU 207 controls the DVR 108 to record a television program currently received by the tuner section A 201 in step S510. However, in the present embodiment, the processing of step S510 is dependent on the situation. For example, if the tuner section A 201 is used to view a television program, the CPU 207 can record the television program in step S510. However, a user may not be using the tuner section A 201. In this case, the CPU 207 can skip the processing of step S510.

The processing of step S510 and succeeding steps is similar to the processing described in the aforementioned exemplary embodiments and is not described again in the present embodiment.

As described above, the broadcast receiving system according to the present embodiment can properly respond to an occurrence of an emergency warning broadcast in a non-viewing state (i.e., standby state), in a 1-screen viewing state, in a 2-screen viewing state, in a program recording state, or in a program recording reservation state.

According to the present embodiment, a user's viewing or recording of a higher-priority program is not interrupted by the reception of an emergency warning broadcast unless a broadcaster cancels the broadcast of the program. Instead, a lower-priority program may be replaced with an emergency warning broadcast. As a result, not only can an emergency warning broadcast be displayed, but a user's viewing or recording a broadcast program can be continued satisfactorily.

In the present embodiment, the tuner section A 201 functions as a main tuner and the tuner section B 212 functions as a sub tuner. Alternatively, the tuner section B 212 can be used as a main tuner.

As understood from the above-described exemplary embodiments, the CPU 207 functions as an acquisition unit configured to obtain a broadcast receiving apparatus control signal involved in the PMT and also functions as a determination unit configured to determine a channel selection state of each tuner. Furthermore, the CPU 207 functions as a control unit configured to control a channel selection action of each tuner or display processing of the monitor 102 or recording processing of the DVR 108 based on the broadcast receiving apparatus control signal and the channel selection state of the tuner.

Moreover, the CPU 207 functions as a checking unit configured to check a state of use of each tuner. However, respective functions of the present invention can be executed by different CPUs or application specific integrated circuits (ASICs). A hardware arrangement, or a combination of a hardware arrangement and a software arrangement, can also be used to realize the functions of the present invention.

Although the present invention has been described based on the above embodiments, any method described in these exemplary embodiments can effectively solve the above-mentioned drawbacks. Thus, the present invention can transmit the contents of an emergency warning broadcast to a user even when a broadcast receiving apparatus includes plural tuners capable of receiving an emergency warning broadcast signal. Furthermore, the present invention can minimize an interruption by a specific broadcast when a user is viewing or recording a broadcast program.

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer, such as a storage (or recording) medium storing the program code. In this case, the type of program can be any one of object code, interpreter program, and OS script data.

A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R)

The method for supplying the program includes accessing a web site on the Internet using the browsing function of a client computer, when the web site allows each user to download the computer program of the present invention.

Moreover, each broadcast receiving apparatus can automatically download, as part of broadcast data, the program code constituting the programs of the present invention. Each broadcaster can periodically update the programs and transmit the newest version to each receiver in an appropriate time slot of its broadcast schedule.

The present invention can be applied to a system including plural devices or can be applied to a single apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-043966 filed Feb. 21, 2006, which is hereby incorporated by reference herein in its entirety.

What is claimed is:

1. A broadcast receiving apparatus comprising:
a plurality of tuners, including first and second tuners, capable of simultaneously receiving broadcast waves of plural channels to display a program of a received channel on a display unit or to record a program of a received channel in a storage unit;
a storage unit configured to store installation location information of the broadcast receiving apparatus;
an acquisition unit configured to obtain a control signal, the control signal including region information identifying a region and channel designation information designating a program broadcast channel;
a determination unit configured to determine whether a channel designated by the channel designation information corresponds to a channel received by the first tuner or a channel received by the second tuner; and
a control unit configured to control a channel selection action of each of the plurality of tuners and display processing for the display unit or recording processing for the storage unit based on the control signal obtained by the acquisition unit and a determination result obtained by the determination unit,
wherein, when the region information corresponds to the installation location information, if the channel designated by the channel designation information is different from the channel received by the first tuner and displayed on the display unit and is equal to the channel received by the second tuner, a program of the channel received by the first tuner is recorded in the storage unit.

2. A broadcast receiving apparatus comprising:
a plurality of tuners, including first and second tuners, capable of simultaneously receiving broadcast waves of plural channels to display a program of a received channel on a display unit or to record a program of a received channel in a storage unit;
a storage unit configured to store installation location information of the broadcast receiving apparatus;
an acquisition unit configured to obtain a control signal, the control signal including region information identifying a region and channel designation information designating a program broadcast channel;
a determination unit configured to determine whether a channel designated by the channel designation information corresponds to a channel received by the first tuner or a channel received by the second tuner; and
a control unit configured to control a channel selection action of each of the plurality of tuners and display processing for the display unit or recording processing for the storage unit based on the control signal obtained by the acquisition unit and a determination result obtained by the determination unit,
wherein, when the region information corresponds to the installation location information, if the channel designated by the channel designation information is different from the channel received by the first tuner and displayed on the display unit and is different from the channel received by the second tuner, the second tuner selects the channel designated by the channel designation information and a program of the channel received by the first tuner is recorded in the storage unit.

3. A broadcast receiving apparatus comprising:
a plurality of tuners, including first and second tuners, capable of simultaneously receiving broadcast waves of plural channels to display a program of a received channel on a display unit or to record a program of a received channel in a storage unit;
a storage unit configured to store installation location information of the broadcast receiving apparatus;
an acquisition unit configured to obtain a control signal, the control signal including region information identifying a region and channel designation information designating a program broadcast channel;
a determination unit configured to determine whether a channel designated by the channel designation information corresponds to a channel received by the first tuner or a channel received by the second tuner;

a checking unit configured to check a state of use of each of the plurality of tuners; and a control unit configured to cause one of the plurality of tuners to receive a broadcast program of the channel designated by the channel designation information to display the received broadcast program on the display unit based on the control signal obtained by the acquisition unit, a determination result obtained by the determination unit, and a checking result obtained by the checking unit, wherein, if the channel designated by the channel designation information is different from a channel received by each of the first and second tuners, the control unit selects a tuner to receive the channel designated by the channel designation information based on the state of use of the first tuner and/or the second tuner.

4. The broadcast receiving apparatus according to claim 3, wherein, if the checking unit determines that the second tuner is not being used and will not be used for a predetermined period of time, the second tuner selects the channel designated by the channel designation information.

5. The broadcast receiving apparatus according to claim 3, wherein, if the checking unit determines that the second tuner is being used or will be used within a predetermined period of time, the checking unit checks a state of use of the first tuner.

6. The broadcast receiving apparatus according to claim 5, wherein, if the checking unit determines that the first tuner is being used or will be used within a predetermined period of time, the second tuner selects the channel designated by the channel designation information.

7. The broadcast receiving apparatus according to claim 6, wherein, if the checking unit determines that the first tuner is being used and a program of a channel received by the first tuner is displayed on the display unit, the program of the channel received by the first tuner is recorded in the storage unit.

8. The broadcast receiving apparatus according to claim 5, wherein, if the checking unit determines that the first tuner is not being used and will not be used for a predetermined period of time, the first tuner selects the channel designated by the channel designation information.

9. A method for controlling a broadcast receiving apparatus holding installation location information thereof and including a plurality of tuners, including first and second tuners, capable of simultaneously receiving broadcast waves of plural channels to display a program of a received channel on a display unit or to record a program of a received channel in a storage unit, the method comprising:

obtaining a control signal, the control signal including region information identifying a region and channel designation information designating a program broadcast channel;

determining whether a channel designated by the channel designation information corresponds to a channel received by the first tuner or a channel received by the second tuner;

controlling a channel selection action of each of the plurality of tuners and display processing for the display unit or recording processing for the storage unit based on the control signal and a determination result of whether the channel designated by the channel designation information corresponds to the channel received by the first tuner or the channel received by the second tuner; and when the region information corresponds to the installation location information, if the channel designated by the channel designation information is different from the channel received by the first tuner and displayed on the display unit and is equal to the channel received by the second tuner, a program of the channel received by the first tuner is recorded in the storage unit.

10. A method for controlling a broadcast receiving apparatus holding installation location information thereof and including a plurality of tuners, including first and second tuners, capable of simultaneously receiving broadcast waves of plural channels to display a program of a received channel on a display unit or to record a program of a received channel in a storage unit, the method comprising:

obtaining a control signal, the control signal including region information identifying a region and channel designation information designating a program broadcast channel;

determining whether a channel designated by the channel designation information corresponds to a channel received by the first tuner or a channel received by the second tuner;

controlling a channel selection action of each of the plurality of tuners and display processing for the display unit or recording processing for the storage unit based on the control signal and a determination result of whether the channel designated by the channel designation information corresponds to the channel received by the first tuner or the channel received by the second tuner; and when the region information corresponds to the installation location information, if the channel designated by the channel designation information is different from the channel received by the first tuner and displayed on the display unit and is different from the channel received by the second tuner, the second tuner selects the channel designated by the channel designation information and a program of the channel received by the first tuner is recorded in the storage unit.

11. A method for controlling a broadcast receiving apparatus holding installation location information thereof and including a plurality of tuners, including first and second tuners, capable of simultaneously receiving broadcast waves of plural channels to display a program of a received channel on a display unit or to record a program of a received channel in a storage unit, the method comprising:

obtaining a control signal, the control signal including region information identifying a region and channel designation information designating a program broadcast channel;

determining whether a channel designated by the channel designation information corresponds to a channel received by the first tuner or a channel received by the second tuner;

checking a state of use of each of the plurality of tuners;

causing one of the plurality of tuners to receive a broadcast program of the channel designated by the channel designation information to display the received broadcast program on the display unit based on the control signal, a determination result of whether the channel designated by the channel designation information corresponds to the channel received by the first tuner or the channel received by the second tuner, and a checking result of the state of use; and wherein, if the channel designated by the channel designation information is different from a channel received by each of the first and second tuners, selecting a tuner to receive the channel designated by the channel designation information based on the state of use of the first tuner and/or the second tuner.

12. The method according to claim 11, further comprising causing the second tuner to select the channel designated by the channel designation information if it is determined that the second tuner is not being used and will not be used for a predetermined period of time.

13. The method according to claim 11, further comprising checking a state of use of the first tuner if it is determined that the second tuner is being used or will be used within a predetermined period of time.

14. The method according to claim 13, further comprising causing the second tuner to select the channel designated by the channel designation information if it is determined that the first tuner is being used or will be used within a predetermined period of time.

15. The method according to claim 14, further comprising recording a program of a channel received by the first tuner if it is determined that the first tuner is being used and the program of the channel received by the first tuner is displayed on the display unit.

16. The method according to claim 13, further comprising causing the first tuner to select the channel designated by the channel designation information if it is determined that the first tuner is not being used and will not be used for a predetermined period of time.

17. A broadcast receiving apparatus comprising:
first and second tuners capable of receiving broadcast waves, the first and second tuners being configured to simultaneously receive plural channels to simultaneously display video images of the respective received channels on a display unit;
a setting unit configured to define a display setting for causing a video image of a channel received by one of the first and second tuners to be displayed as a main screen on the display unit and causing a video image of a channel received by the other tuner to be displayed as a sub screen on the display unit;
an acquisition unit configured to obtain channel designation information designating a program broadcast channel from a control signal received by each of the first and second tuners;
a determination unit configured to determine whether a channel designated by the channel designation information corresponds to a channel received by the first tuner or a channel received by the second tuner; and
a control unit configured to, based on the channel designation information obtained by the acquisition unit, the display setting defined by the setting unit, and a determination result obtained by the determination unit, determine, among the first and second tuners, a tuner to be used to receive a program broadcast channel designated by the channel designation information,
wherein, if the channel designated by the channel designation information is different from the channel being received by the first tuner and a video image of the channel being received by the first tuner is set to be displayed as the main screen, the control unit causes the channel designated by the channel designation information to be received by the second tuner.

18. The broadcast receiving apparatus according to claim 17, wherein, in response to determining that the second tuner is used to receive the channel designated by the channel designation information, the control unit executes control for changing a display mode of a video image of the channel received by the second tuner from a sub screen display mode to a full screen display mode.

19. The broadcast receiving apparatus according to claim 18, wherein, in response to changing a display mode of a video image of the channel received by the second tuner from the sub screen display mode to the full screen display mode, the control unit executes control for storing a video image of the channel being received by the first tuner in a storage unit.

20. A method for controlling a broadcast receiving apparatus including first and second tuners capable of receiving broadcast waves, the first and second tuners being configured to simultaneously receive plural channels to simultaneously display video images of the respective received channels on a display unit, the method comprising:
defining a display setting for causing a video image of a channel received by one of the first and second tuners to be displayed as a main screen on the display unit and causing a video image of a channel received by the other tuner to be displayed as a sub screen on the display unit;
obtaining channel designation information designating a program broadcast channel from a control signal received by each of the first and second tuners;
determining whether a channel designated by the channel designation information corresponds to a channel received by the first tuner or a channel received by the second tuner; and
determining, among the first and second tuners, a tuner to be used to receive a program broadcast channel designated by the channel designation information based on the obtained channel designation information, the display setting, and a determination result of whether the channel designated by the channel designation information corresponds to the channel received by the first tuner or the channel received by the second tuner,
causing the channel designated by the channel designation information to be received by the second tuner if the channel designated by the channel designation information is different from the channel being received by the first tuner and a video image of the channel being received by the first tuner is set to be displayed as the main screen.

21. The method according to claim 20, further comprising, in response to determining that the second tuner is used to receive a channel designated by the channel designation information, changing a display mode of a video image of the channel received by the second tuner from a sub screen display mode to a full screen display mode.

22. The method according to claim 21, further comprising, in response to changing a display mode of a video image of the channel received by the second tuner from the sub screen display mode to the full screen display mode, storing a video image of the channel being received by the first tuner in a storage unit.

* * * * *